United States Patent [19]
Aina et al.

[11] Patent Number: 6,160,660
[45] Date of Patent: Dec. 12, 2000

[54] BIDIRECTIONAL OPTICAL TRANSMISSION SYSTEM FOR DENSE INTERLEAVED WAVELENGTH DIVISION MULTIPLEXING

[75] Inventors: Stefano Aina, Milan; Fausto Meli, Piacenza; Stefano Piciaccia, Milan, all of Italy

[73] Assignee: Pirelli Cavi E Sistemi S.p.A., Milan, Italy

[21] Appl. No.: 09/222,780

[22] Filed: Dec. 30, 1998

Related U.S. Application Data

[60] Provisional application No. 60/071,722, Jan. 16, 1998.

[30] Foreign Application Priority Data

Dec. 31, 1997 [EP] European Pat. Off. ............. 97123014

[51] Int. Cl.⁷ ...................................................... H01S 3/00
[52] U.S. Cl. ........................................... 359/341; 359/124
[58] Field of Search .................................... 359/341, 124, 359/130, 349

[56] References Cited

U.S. PATENT DOCUMENTS

| | | |
|---|---|---|
| 5,260,823 | 11/1993 | Payne et al. . |
| 5,283,686 | 2/1994 | Huber . |
| 5,351,321 | 9/1994 | Snitzer et al. . |
| 5,677,786 | 10/1997 | Meli .................................. 359/341 |
| 5,742,416 | 4/1998 | Mizrahi .................................. 359/134 |
| 5,748,364 | 5/1998 | Meli et al. . |
| 5,808,787 | 9/1998 | Meli et al. . |
| 5,812,306 | 9/1998 | Mizrahi .................................. 359/341 |

FOREIGN PATENT DOCUMENTS

| | | |
|---|---|---|
| 0 677 902 A1 | 10/1995 | European Pat. Off. . |
| 0 724 314 A1 | 7/1996 | European Pat. Off. . |
| 0 729 248 A2 | 8/1996 | European Pat. Off. . |
| 2 304 248 | 3/1997 | United Kingdom . |

OTHER PUBLICATIONS

C. Barnard et al., "Bidirectional Fiber Amplifiers", IEEE Photonics Tech. Ltrs., 4(8) :911–913 (1992).

S. Seikai et al., "Novel Optical Circuit Suitable for Wavelength Division Bidirectional Optical Amplification", Electronics Letters 29 (14) :1268–1270 (1993).

"High Gain, Broadband 1.6$\mu$m $Er^{3+}$ Doped Silica Fibre Amplifier", Electronics Letters, 26(20) :1645–1646 (1990).

*Primary Examiner*—Mark Hellner
*Attorney, Agent, or Firm*—Finnegan, Henderson, Farabow, Garrett & Dunner, L.L.P.

[57] ABSTRACT

An optical fiber amplifier and filtering apparatus and method for a bidirectional wavelength-division-multiplexing (WDM) system having odd and even interleaved channels is disclosed. The apparatus uses optical circulators, in-fiber Bragg gratings, and erbium-doped fiber amplifiers to amplify channels traveling in opposite directions in a WDM system and to filter unwanted ASE and back reflection noise between the channels. Interface circulators positioned at opposite ends of the apparatus respectively receive odd and even channels traveling in opposite directions in the WDM system and pass the channels through an erbium-doped fiber amplifier. Other circulators direct the amplified channels to two series of Bragg gratings that respectively reflect only the odd channels and pass only the even channels or vice versa, thereby filtering ASE and other noise located between the channels. An additional amplifier may boost the channels before they exit the apparatus via the interface circulators.

21 Claims, 4 Drawing Sheets

BIDIRECTIONAL OPTICAL TRANSMISSION SYSTEM FOR DENSE INTERLEAVED WAVELENGTH DIVISION MULTIPLEXING

This application claims the benefit of U.S. Provisional application No. 60/071,722, filed Jan. 16, 1998.

BACKGROUND OF THE INVENTION

The present invention relates generally to the field of wavelength division multiplexing within optical transmission systems, and more particularly to the field of wavelength division multiplexing having bidirectional transmission for interleaved optical signals amplified with rare-earth doped fiber amplifiers.

Optical transmission systems often includes optical amplifiers in their transmission paths to avoid excessive attenuation of a transmitted optical signal. The optical amplifier can be a length of optical fiber doped with a rare-earth element, for example erbium. These rare-earth-doped fiber amplifiers provide amplification of a characteristic transmission signal bandwidth when they are simultaneously stimulated or pumped with a characteristic pump wavelength. For fiber amplifiers doped with erbium, the characteristic pump wavelength is generally either 980 nm or 1480 nm, which results in a stimulated emission spectrum for the amplifier across a band of about 1530–65 nm. Therefore, the erbium-doped fiber amplifier will amplify transmission signals passing through it at these wavelengths. It is also known, e.g., from Electronics Letters, Vol. 26, No. 20, Sep. 27, 1990, p. 1645–46, that an erbium doped fiber amplifier can provide amplification in the 1570–1610 nm wavelength band, by appropriate selection of pumping conditions, active fiber doping and length. Wavelength-division-multiplexing (WDM) systems that transmit a plurality of information signals as modulated channels along a single optical path must use channel wavelengths that correspond with the stimulated emission spectrum particular to the erbium-doped fiber amplifier. In general, the erbium-doped fiber amplifier will amplify transmission signals passing through it at wavelengths in an extended band of about 1525–1610 nm or in sub-bands of the extended band. The following description will refer to a band of 1530–1565 nm. However, by making obvious changes the skilled in the art can apply the teaching of the invention to an extended band, for example from 1525 nm to 1610 nm, to sub-bands of the extended band or to other wavelength bands, as needed, in particular if active substances other than erbium are used.

In addition to generating stimulated emission due to the introduction of a characteristic pump wavelength, rare-earth doped fiber amplifiers also tend to generate unwanted amplified spontaneous emission (ASE). ASE, when subject to a high gain within the amplifier, contributes a substantial light level at the output of the amplifier and can saturate the amplifier output. Moreover, the ASE is nearly proportional to the amplifier gain, and therefore, the ASE spectrum is similar to the gain spectrum.

ASE also causes problems more specific to WDM systems. As mentioned, WDM systems carry a plurality of channels of modulated information over a common transmission medium, and when erbium-doped fiber amplifiers are used, generally have a carrier wavelength between about 1530 nm and 1565 nm. When the number of channels in a WDM system becomes dense, e.g. equals or exceeds sixteen (16), the wavelength spacing between the channels becomes practically small. As the spacing decreases, potential problems in differentiating between the channels arise, as do problems with increased crosstalk and decreased signal-to-noise ratio.

FIG. 1 illustrates the representative spectra of ASE noise generated by a typical erbium-doped fiber amplifier. The curve 100 in FIG. 1 depicts the ASE noise, which is similar to the stimulated emission spectra for the fiber amplifier. Signals 110 and 120 represent two generic wavelengths of a WDM system that are centered at predetermined wavelengths within the bandwidth 130 of an erbium-doped fiber amplifier in the system, which would span about 1530–65 nm. As shown in FIG. 1, the ASE noise creates a signal-to-noise ratio 140 for the WDM channels.

Several patents and publications have addressed techniques for removing ASE noise in a fiber amplifier system. U.S. Pat. No. 5,260,823 to Payne et al., for example, discloses particular advantages in locating a filter within the length of a fiber amplifier rather than at its end to remove ASE noise. The '823 patent states that an optical band-stop filter can be incorporated in the fiber at appropriate points using, for instance, thin colored-glass filters, Fabry-Perot filters, and Bragg filters. U.S. Pat. No. 5,283,686 to Huber discloses an arrangement having a circulator and a Bragg grating coupled to an erbium-doped fiber amplifier. A desired signal and undesired ASE enter a first port of the circulator from the fiber amplifier, and a Bragg grating attached to the second port of the circulator reflects the desired signal and allows the ASE to pass. According to the '686 patent, the desired signal returns to the circulator and exits from a third circulator port.

EP 729,248 discloses a bidirectional system for multi-channel optical fiber communications. FIG. 2 in EP 729,248 illustrates bidirectional amplifier for interleaved channels f1, f2, f3, and f4, where f1 and f3 propagate in one direction and f2 and f4 propagate in the opposite direction. Channels f1 and f3 travel west to east in FIG. 2 of EP 729,248, rotate through circulator 20, are reflected by Bragg gratings 28 and 29, respectively, pass through amplifier 22, rotate through circulator 21, and exit from the system. Channels f2 and f4 travel in the opposite direction but interact with circulator 21, Bragg gratings 30 and 31, amplifier 23, and circulator 20. Bragg gratings 28–31 are used as filters in the bidirectional system but filter the channels as they enter the amplifier structure. As a result, the Bragg gratings in EP 729,248 do not filter ASE introduced by amplifiers 22 and 23.

Barnard et al., "Bidirectional Fiber Amplifiers," IEEE Photonics Tech. Ltrs., Vol. 4, No. 8, pp. 911–13 (1992) discloses a bidirectional erbium-doped fiber amplifier module that uses directional couplers to separate eastbound and westbound signals for amplification in separate fiber amplifiers. This paper recognizes that multiple reflection-induced relative intensity noise, e.g. due to Rayleigh back scattering, may lead to a power penalty for a bidirectional amplifier module. For direct digital detection at a desired bit error rate of $10^{-9}$, this power penalty is disclosed as:

$$\text{penalty} = -5 \log [1 - 144 \, R_{\textit{eff}}^2] \tag{1}$$

where the effective reflectance $R_{\textit{eff}}$ equals $R_1 R_2/2$ for discrete reflections with intensity reflection coefficients $R_1$ and $R_2$, while $R_{\textit{eff}}$ equals $R_{bs}/\sqrt{2}$ for Rayleigh back scattering, with $R_{bs} \approx 32$ dB for fibers longer than 20 km. If an unisolated optical amplifier with gain G is located between the reflections, the effective reflectance increases to $GR_{\textit{eff}}$. To help minimize the power penalty, the paper discloses that non-overlapping optical bands, e.g. 1525–35 nm and 1550–60 nm, could be assigned to the signals in opposite directions by adding narrow band pass optical filters to each unidirectional path in the bidirectional amplifier module.

Applicants have discovered that with the increased density of channels in WDM systems and the use of a bidirectional architecture using interleaved channels or interleaved packets of channels, the efficient removal of ASE noise, of other noise reflections between the channels of the system and of the echo of the channel themselves, due to reflection or back scattering, has a heightened importance to enabling a close channel-to-channel spacing for the system, for given spectral characteristics of the available wavelength selective components used to separate the signals at the various wavelengths.

Applicants have further found that an arrangement of optical circulators and Bragg gratings with rare-earth doped fiber amplifiers can provide a compact and practical apparatus for amplifying interleaved, bidirectional channels or packets of channels while removing unwanted ASE between them and protecting the system from interferometric noise due to unwanted reflections at fiber interfaces or due to Rayleigh back scattering in transmission fibers.

SUMMARY OF THE INVENTION

In accordance with the present invention, an optical transmission system has been designed to optimize the use of Bragg gratings, such as fiber gratings, to eliminate noise from multiplexed optical signals in a bidirectional optical transmission system. The system includes two groups of channels propagating in opposite directions that are reflected and filtered by two groups of fiber gratings. Each group of fiber gratings reflects one group of channels but passes and filters the other group of channels. The combination of reflecting and filtering each group of channels greatly reduces the amount of ASE created by the optical amplifiers in the bidirectional optical transmission system and protects the system from interferometric noise due to unwanted reflections of fiber interfaces or due to Rayleigh back scattering from transmission fibers.

To obtain the advantages and in accordance with the purpose of the invention, as embodied and broadly described herein, a bidirectional optical amplifier consistent with the present invention amplifies a first and second series of wavelengths, where the second series of wavelengths is interleaved with the first series of wavelengths and travels in an opposite direction. The amplifier includes a first port for receiving the first series of wavelengths; a second port for receiving the second series of wavelengths; a first active fiber coupled to receive and amplify the first series of wavelengths from the first port; and a second active fiber coupled to receive and amplify the second series of wavelengths from the second port. The amplifier further includes a first set of fiber gratings having one end coupled to receive the first series of wavelengths amplified by the first active fiber and another end coupled to receive the second series of wavelengths amplified by the second active fiber, where the first set has reflection wavelengths corresponding substantially to the first series of wavelengths. As well, the amplifier includes a second set of fiber gratings having one end coupled to receive the first and second series of wavelengths from the one end of the first set of fiber gratings, where the second set has reflection wavelengths corresponding substantially to the second series of wavelengths; a third active fiber, coupled to receive and amplify the first series of wavelengths from another end of the second set of fiber gratings, where the third active fiber is positioned to output the amplified first series of wavelengths to the second port; and a fourth active fiber, coupled to receive and amplify the second series of wavelengths reflected by the second set of fiber gratings, where the fourth active fiber is positioned to output the amplified second series of wavelengths to the first port.

In another aspect, an apparatus consistent with the present invention for amplifying bidirectional, interleaved wavelength-division-multiplexed (WDM) signals includes a first bidirectional transfer device positioned to receive eastbound WDM signals; a second bidirectional transfer device positioned to receive westbound WDM signals; an eastbound fiber amplifier positioned between the first and second bidirectional transfer devices for amplifying the eastbound WDM signals; a westbound fiber amplifier positioned between the second and first bidirectional transfer devices for amplifying the westbound WDM signals; and a filtering module positioned between the eastbound and westbound fiber amplifiers. The filtering module includes a first filter for reflecting toward a second filter the eastbound WDM signals entering an end of the first filter from the eastbound fiber amplifier and for passing toward the second filter the westbound WDM signals entering an opposite end of the first filter from the westbound fiber amplifier; and the second filter for reflecting toward the first bidirectional transfer device the westbound WDM signals entering an end of the second filter from the first filter and for passing toward the second bidirectional transfer device the eastbound WDM signals.

In addition, a method for transmitting optical signals, consistent with the present invention, includes the steps of amplifying a first plurality of signals having different wavelengths, reflecting each of the amplified plurality of signals with a first plurality of Bragg gratings, filtering each of the reflected first plurality of signals with a second plurality of Bragg gratings, and amplifying the filtered first plurality of signals. The method also includes the steps of amplifying a second plurality of signals having different wavelengths interleaved with the first plurality of signals, filtering each of the amplified second plurality of signals with the first plurality of Bragg gratings, reflecting each of the filtered second plurality of signals with the second plurality of Bragg gratings, and amplifying the reflected second plurality of signals.

It is to be understood that both the foregoing general description and the following detailed description are exemplary and explanatory only and are not restrictive of the invention, as claimed. The following description, as well as the practice of the invention, set forth and suggest additional advantages and purposes of this invention.

BRIEF DESCRIPTION OF THE DRAWINGS

The accompanying drawings, which are incorporated in and constitute a part of this specification, illustrate embodiments of the invention and, together with the description, explain the advantages and principles of the invention.

DESCRIPTION OF THE PREFERRED EMBODIMENT

Figure 1:
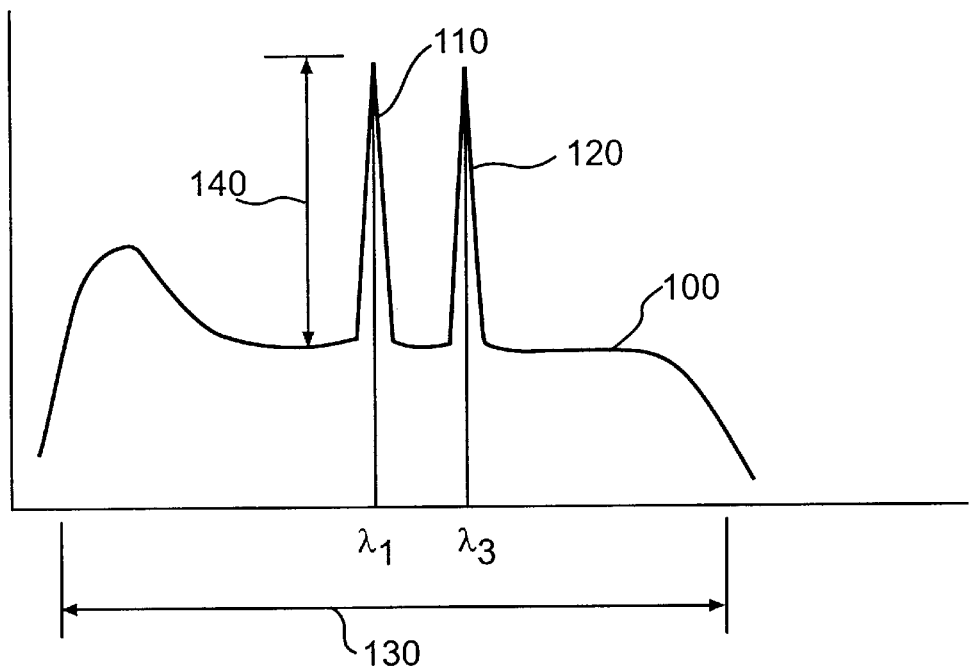
FIG. 1 is a graph of representative spectra of amplified spontaneous emission in an erbium-doped fiber amplifier in a WDM system with two channels.

Reference will now be made to various embodiments according to this invention, examples of which are shown in the accompanying drawings and will be obvious from the description of the invention. In the drawings, the same reference numbers represent the same or similar elements in the different drawings whenever possible.

Figure 2:
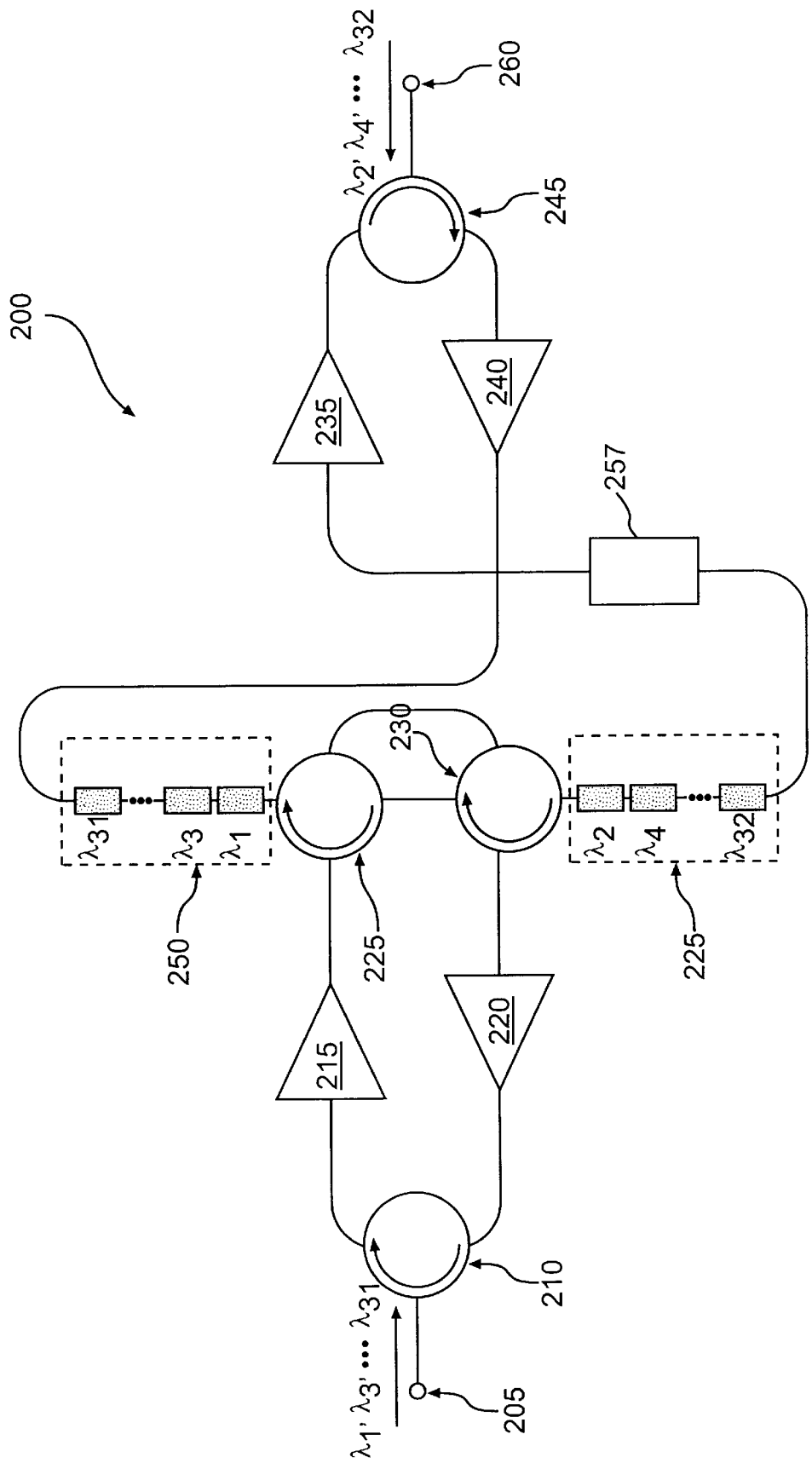
FIG. 2 is a schematic diagram of a first embodiment of the present invention for amplifying and filtering bidirectional, interleaved WDM channels.

This invention relates to a bidirectional optical transmission system that optimizes the use of in-fiber Bragg gratings to eliminate noise from multiplexed optical signals in the bidirectional optical transmission system. FIG. 2 is a block diagram of a bidirectional optical amplifier module 200 consistent with the present invention. Module 200 includes two ports 205 and 260, four optical circulators 210, 225, 230, and 245, four optical amplifiers 215, 220, 235, and 240, and two groups of in-fiber Bragg gratings 250 and 255. Module 200 generally provides a concise apparatus and method for bidirectionally amplifying interleaved channels and may be located within the transmission path of a larger WDM system. For example, ports 205 and 260 in module 200 may be connected to optical transmission fiber for a WDM ring network or for a long-distance link within a multi-link WDM system, such that module 200 serves as one of a plurality of optical line amplifier sections in an overall WDM optical transmission system.

Port 205 is coupled to receive a first group of channels traveling in an inbound or east direction. As shown in FIG. 2, the first group corresponds to a first series of wavelengths Indicated with odd-numbered subscripts $\lambda_1, \lambda_3, \ldots, \lambda_{31}$ and representing odd channels. Similar to port 205, port 260 is coupled to receive a second group of channels traveling in an outbound or west direction. The second group of channels, however, corresponds to even-numbered wavelengths indicated with even-numbered subscripts $\lambda_2, \lambda_4, \ldots, \lambda_{32}$. The second or even group preferably includes the same number of channels as the odd group. In addition, the channels of the even group are preferably interleaved with the channels of the odd group. Thus, the even-numbered wavelengths are selected so that they are staggered with respect to the odd-numbered wavelengths. In some circumstances, a select number of wavelengths in either the odd or even wavelengths may not be available due to the configuration of the WDM system, however, in a preferred setup, each pair or wavelengths of one series, e.g. the odd wavelengths or channels, encompasses a wavelength of the other series.

The wavelengths of the east and west series of wavelengths will be indicated as staggered, more generally, even when the wavelengths of the signals of each of the series are separated (in frequency) by a quantity greater than or equal to 2D, where D indicates the minimum bandwidth (in frequency) of the wavelength selective components used in the system to separate the signals at the various wavelengths.

Alternative to an arrangement of individually interleaved channels, where each pair of wavelengths of one series encompasses a wavelength of the other series, multiple wavelengths of each series may be grouped together in respective multiple packets. The packets of channels in one series may then be interleaved with packets of channels from the other series, such that each pair of packets of one series encompasses a packet of the other series.

As mentioned, the odd and even groups preferably have the same number of channels. The two groups, although preferably including sixteen channels each, may include more or fewer channels. The number of wavelengths corresponding to the number of optical channels used for transmission in each direction may be selected in relation to the characteristics of the telecommunication system in which module 200 is implemented. In particular, in a telecommunication system according to the present invention, the number of channels in the system may be increased to increase the transmitting capacity of the system, e.g. to accommodate an increased traffic demand.

The useful amplification band of the amplifiers may also be constituted of two or more distinct spectral bands separated by spectral bands not well-suited for signal transmission or amplification, e.g. due to the particular spectral characteristics of the amplifiers or optical fibers employed in the telecommunication system. In this case, the wavelengths of the communication channels may, for example, be selected such that the corresponding frequencies are equally spaced within each individual spectral band, with the separation between adjacent channels propagating in the same direction greater than or equal (in frequency) to twice the value D.

In an example, each of the channels in the odd group is separated by 200 GHz and each of the channels in the even group is separated by 200 GHz. Since the channels of both groups are preferably interleaved, a channel of one group would lie halfway in between a pair of channels in the other group. For example, $\lambda_2$ would be 100 GHz below $\lambda_3$, and 100 GHz above $\lambda_1$. Note that since the speed of light, c, is equal to the product of channel wavelength and channel frequency, the above separations could also be determined by wavelength. The channels could also be unevenly spaced if desired, for instance to offset any four-wave mixing effects in the overall transmission system.

Turning again to FIG. 2, ports 205 and 260 pass the odd group and even group of channels to optical circulators 210 and 245, respectively. Optical circulators 210, 225, 230, and 245 are each conventional three-port optical circulators. Each port of the circulator can both input and output a signal. In addition, as shown, each optical circulator transmits unidirectionally the radiation input at each of the ports to only the next circulator port in sequence. In the three-port-circulators of FIG. 2, the rotational sequence is in a clockwise direction. Thus, a signal received at a port is input to the circulator at an input port and passed in a clockwise direction to the next port of the circulator, which outputs the signal.

Optical circulators 210, 225, 230, and 245 are standard passive components in the optical communications field and can be obtained from several suppliers, such as JDS FITEL Inc., 570 Heston Drive, Nepean, Ontario (CA) or E-TEK DYNAMICS, Inc., 1885 Lundy Ave., San Jose, Calif. (USA). Preferably, circulators for use with the present invention are of the polarization-independent type.

Optical circulators 210 and 245 circulate and output the odd group and even group of channels to amplifiers 215 and 240, respectively. Amplifiers 215, 220, 235, and 240 of module 200 are preferably erbium-doped fiber amplifiers. Aluminum, germanium, and lanthanum, or aluminum and germanium, may be advantageously used as secondary doping agents. The concentration of dopants may correspond, for example, to an attenuation of around 7 dB/m, for the active fiber in the absence of pumping. In a preferred embodiment, the amplifier described uses erbium-doped active fibers of the type presented in detail in patent application EP 677902, in the name of the Applicant, which is herein incorporated by reference.

Each amplifier is pumped, for example, by one or more laser diodes (not shown) to provide optical gain to the signals it amplifies. The amplifiers provide optical gain to each of the channels to offset attenuation. However, in addition to providing the gain, the amplifiers also add noise, such as ASE, to the channels.

Amplifier 215 amplifies and outputs the odd group of channels to optical circulator 225, which passes the odd group of channels to selective reflection filters 250. Amplifier 240 amplifies and outputs the even group of channels directly to selective reflection filters 250. Selective reflection filters 250 and 255 can be, for example, in-fiber Bragg gratings or Bragg filters having a plurality of Bragg gratings.

Distributed Bragg reflection optical waveguide filters are an example of selective reflection filters adapted for use in the present invention. They reflect the radiation in a narrow wavelength band and transmit the radiation outside that band. Each of them comprises a section of an optical waveguide, e.g. an optical fiber, along which the refractive index shows periodical variations. If the signal portions reflected at each index change are in phase, constructive interference results and the incident signal is reflected. The condition for constructive interference, corresponding to the maximum reflection, is expressed by the relation $2 \cdot l = \lambda_s/n$, where l indicates the pitch of the grating formed by the refractive index variations, $\lambda_s$ is the wavelength of the incident radiation, and n is the effective refractive index of the optical waveguide. The periodical refractive index variation in the Bragg gratings can be achieved by known techniques, for example by exposing a section of an optical fiber, deprived of the protective coating, to the interference fringes formed by a strong UV beam (like the one generated by an excimer laser, a frequency-doubled argon laser, or a frequency-quadrupled Nd:YAG laser) put into interference with itself by an appropriate interferometric system, e.g. by a silicon phase mask, as described in U.S. Pat. No. 5,351, 321.

Each grating only reflects light propagating through the fiber within a very narrow range around a central wavelength. Using commonly known techniques, Bragg grating filters can be obtained with a −0.5 dB band of reflected wavelengths that is typically only 0.3–0.4 nm wide and a −20 dB band of reflected wavelengths of about 1 nm or less, with reflectivity up to 99% in the center of the band. A central wavelength change With temperature can be obtained not higher than 0.02 nm/° C. Due to possible temperature fluctuations, Bragg gratings 250 and 255 may be associated with a standard Peltier cell, which is a conventional temperature stabilization device readily known and available to those of ordinary skill in the art, or other conventional temperature stabilization means.

Turning to FIG. 2, the individual gratings within distributed. Bragg grating 250 are set to reflect respectively each of the odd group of channels, but pass each of the even group of channels. Conversely, the gratings of fiber gratings 255 are set to reflect each of the even group of channels and pass each of the odd group of channels. Each of the gratings may be chirped if desired, to compensate for dispersion. The center-band reflectivity may change from grating to grating, to flatten or otherwise shape the amplification spectrum.

In fiber gratings 250, the gratings reflect the odd group of channels, but pass the signals located between the channels, which includes noise and ASE. Thus, the reflection of a channel by a fiber grating serves to eliminate noise and ASE located between the channels, either created by amplifier 215 or due to back reflection of even channels at fiber interfaces, e.g. from Rayleigh back scattering. With narrow-band Bragg gratings, i.e. with a reflection band of less than 1 nm and preferably less than 0.5 nm, the signal reflected by the fiber gratings reflects essentially only the data signals that correspond to the odd group of channels. In addition, by separating the channels from the noise and ASE located between the channels, the signal-to-noise ratio (SNR) for the channels is enhanced. Fiber gratings 250 are particularly advantageous in minimizing interferometric noise caused by reflections from fiber interfaces or Rayleigh back scattering, as discussed further below.

After passing unreflected through fiber gratings 250, the ASE and other noise generated by amplifier 215 or caused by back reflection travels to the output of amplifier 240. Amplifier 240 preferably includes an isolator (not shown) positioned at its output that prohibits the passage of signals into amplifier 240. Opto-isolators are commonly available on the market from such suppliers as ISOWAVE, 64 Harding Avenue, Dover, N.J. (USA). As a result, the ASE and other noise separated at fiber gratings 250 are extinguished by the isolator at amplifier 240.

After being reflected by gratings 250, the odd group of channels return to circulator 225 and rotate to the third port of the circulator. At this port, the odd group of channels exits and enters circulator 230 at a second port of that device. Circulator 230 rotates the odd group of channels to the next port, where they exit and pass into Bragg gratings 255. In contrast to Bragg gratings 250, filter 255 has Bragg gratings with reflection wavelengths equal to the even channels. As a result, the odd channels entering filter 255 from circulator 230 pass through filter 255 and proceed to the next amplifier 235. Due to the interleaved arrangement of channels in module 200, the center wavelengths of the Bragg gratings in filter 255 coincide with the wavelengths between the odd channels. Thus, filter 255 acts as a notch filter to remove any additional ASE or other type of noise present in the narrow bands between the odd channels, i.e. the wavelengths corresponding to the even channels, which prevents generation of any substantial amount of interferometric noise, and allows operation of the amplifier with a dense channel spacing.

After exiting the filter 255, the odd channels pass through an ASE peak suppression filter 257 and enter the second amplifier. ASE peak suppression filter 257 serves to remove ASE at wavelengths outside the bandwidth of the WDM system and will be discussed in more detail below with respect to the transmission of even channels through module 200. Fiber amplifier 235, which preferably although not restrictively is doped with erbium, further amplifies the odd channels and is optional to the performance of the present invention. As with the other amplifiers in module 200, amplifier 235 includes at least one laser diode source for providing pumping radiation, typically of either 980 nm or 1480 nm, for the amplifier. As also with the other amplifiers, amplifier 235 may comprise a single-stage or a multi-stage configuration, depending on the system requirements. As well, amplifier 235 may have an opto-isolator (not shown) positioned at its input to prohibit unwanted reflections or similar noise from entering the amplifier.

Preferably, amplifier 235 operates in a saturated condition. This mode of operation for amplifier 235 helps to create an increased power boost to the odd channels before they exit module 200. As well, operating amplifier 235 in saturation will minimize the amount of ASE generated by that amplifier. In a saturated condition, amplifier 235 operates with a lower gain, which results in less ASE. Alternatively, a filter could be added after the output of amplifier 235 to remove ASE generated by this second amplifier for the odd channels, but the addition of such a filter adds attenuation to the overall amplifier module.

After being amplified in amplifier 235 and exiting, the odd channels enter circulator 245, which passes them to port 260. Port 260, of course, may be connected to the optical transmission path (not shown) of a WDM system for transmitting the amplified odd channels.

In the opposite direction in the bidirectional amplifier module 200, even channels $\lambda_2, \lambda_4, \ldots, \lambda_{32}$ enter module 200 from port 260 and travel east to west in FIG. 2. These even channels undergo similar filtering and amplification in module 200 as do the odd channels. At first, circulator 245 rotates the received even channels from port 260 to the next clockwise port, where they exit. The even channels then enter amplifier 240, which provides amplification to the even channels while operating in a linear mode but also introduces unwanted ASE and other noise. As with the other amplifiers in module 200, amplifier 240 is a rare-earth doped fiber amplifier, preferably doped with erbium, and may comprise a single-stage or multi-stage amplifier as needed.

After being amplified in amplifier 240, the even channels pass through standard optical fiber to filter 250. As mentioned, filter 250 is a selective reflection filter that preferably is a Bragg filter having a plurality of Bragg gratings at predetermined center wavelengths that correspond to the odd channel wavelengths. When the even channels with ASE travel through filter 250, noise is reflected that is positioned at wavelengths between the even channels that are within the reflection band of the gratings, i.e. within a narrow band around the odd channel wavelengths. Thus, filter 250 acts as a notch filter for the even wavelengths and improves the isolation from unwanted reflections of the odd channels at ports 260, 205, e.g. due to Rayleigh back scattering. Otherwise, the even channels pass through filter 250 and enter circulator 225, which rotates them clockwise to the next port and outputs them to circulator 230. Circulator 230 in turn performs the same function and outputs the even channels to filter 255.

As mentioned, filter 255 is also a selective reflection filter that preferably is a Bragg filter having a plurality of Bragg gratings at predetermined center wavelengths that correspond to the even channel wavelengths. Consequently, filter 255 reflects the even channels and a narrow band, i.e. less than 1 nm and preferably less than 0.5 nm, back to circulator 230 and passes all other signals. ASE accumulated from amplifier 240 and other noise is therefore removed from the even channels. The even wavelengths are then rotated clockwise in circulator 230 and exit into amplifier 220.

Like amplifier 235, amplifier 220, which preferably although not restrictively is doped with erbium, further amplifies the channels and is optional to the performance of the present invention. As with the other amplifiers in module 200, amplifier 220 includes at least one laser diode source for providing pumping radiation, typically of either 980 nm or 1480 nm, for the amplifier. As also with the other amplifiers, amplifier 220 may comprise a single-stage or a multi-stage configuration, depending on the system requirements.

Preferably, amplifier 220 operates in a saturated condition. This mode of operation for amplifier 220 helps to create an increased power boost to the even channels before they exit module 200. As well, operating amplifier 220 in saturation will minimize the amount of ASE generated by that amplifier. In a saturated condition, amplifier 220 operates with a lower gain, which results in less ASE. Alternatively, a filter could be added after the output of amplifier 220 to remove ASE generated by this second amplifier for the even channels, but the addition of such a filter adds attenuation to the overall amplifier module.

Applicants have found that despite the use of fiber gratings 250 and 255 to remove ASE and other noise and provide better channel-to-channel isolation, oscillation or ringing at wavelengths outside the bandwidth of the WDM system may arise due to reflections at port 260. Moreover, Applicants have found that by using ASE peak suppression filter 257, which is positioned between fiber gratings 255 and amplifier 235, possible loss of output power for module 200 is prevented.

In particular, for the even channels, amplifier 240 generates ASE and other noise that are at wavelengths outside both the odd and even channel wavelengths of the WDM system. While fiber gratings 250 and 255 help to improve the channel-to-channel isolation for the even channels as they pass to the second amplifier 220, these gratings do not filter out noise at wavelengths that are higher than the highest even channel wavelength or lower than the lowest even channel wavelength. These extreme noise wavelengths pass through fiber gratings 250, circulators 225 and 230, and fiber gratings 255. Additional ASE noise is generated by amplifier 235. ASE peak suppression filter 257, however, removes these extreme noise wavelengths from module 200. ASE filter, or another filter in series with ASE filter (not shown), may also remove ASE at wavelengths that are not used for transmission (if any) if no grating is provided at those wavelengths, so as to keep ASE power low.

Without the use of filter 257, the extreme noise wavelengths would pass through amplifier 235 and circulator 245 and may be reflected by port 260. Then, the extreme noise wavelengths would reenter module 200, passing back through amplifier 240, gratings 250, circulator 225, circulator 230, and gratings 255, thereby creating an oscillation or ringing from the loop-back. Such a ringing, while outside the channel wavelengths, would cause a detrimental and undesired loss of output power to module 200. ASE peak suppression filter 257 effectively removes the extreme noise wavelengths and avoids any ringing. The placement of ASE peak suppression filter 257 between amplifiers 215 and 235 ensures that the second amplifier 235 can compensate for the loss of power caused by filter 257.

Due to the layout of module 200, only one ASE peak suppression filter 257 is required. On the odd channel input side, noise at wavelengths that are higher than the highest odd channel wavelength or lower than the lowest odd channel wavelength generated by amplifier 215 rotate through circulator 225 and pass through fiber gratings 250. As mentioned, the isolator (not shown) at the output of amplifier 240 blocks the passage of all wavelengths including the extreme noise wavelengths. As a result, ringing or oscillation caused by a loop-back of reflections from port 205 does not exist as it may at port 260 on the even channel input side.

Figure 3:
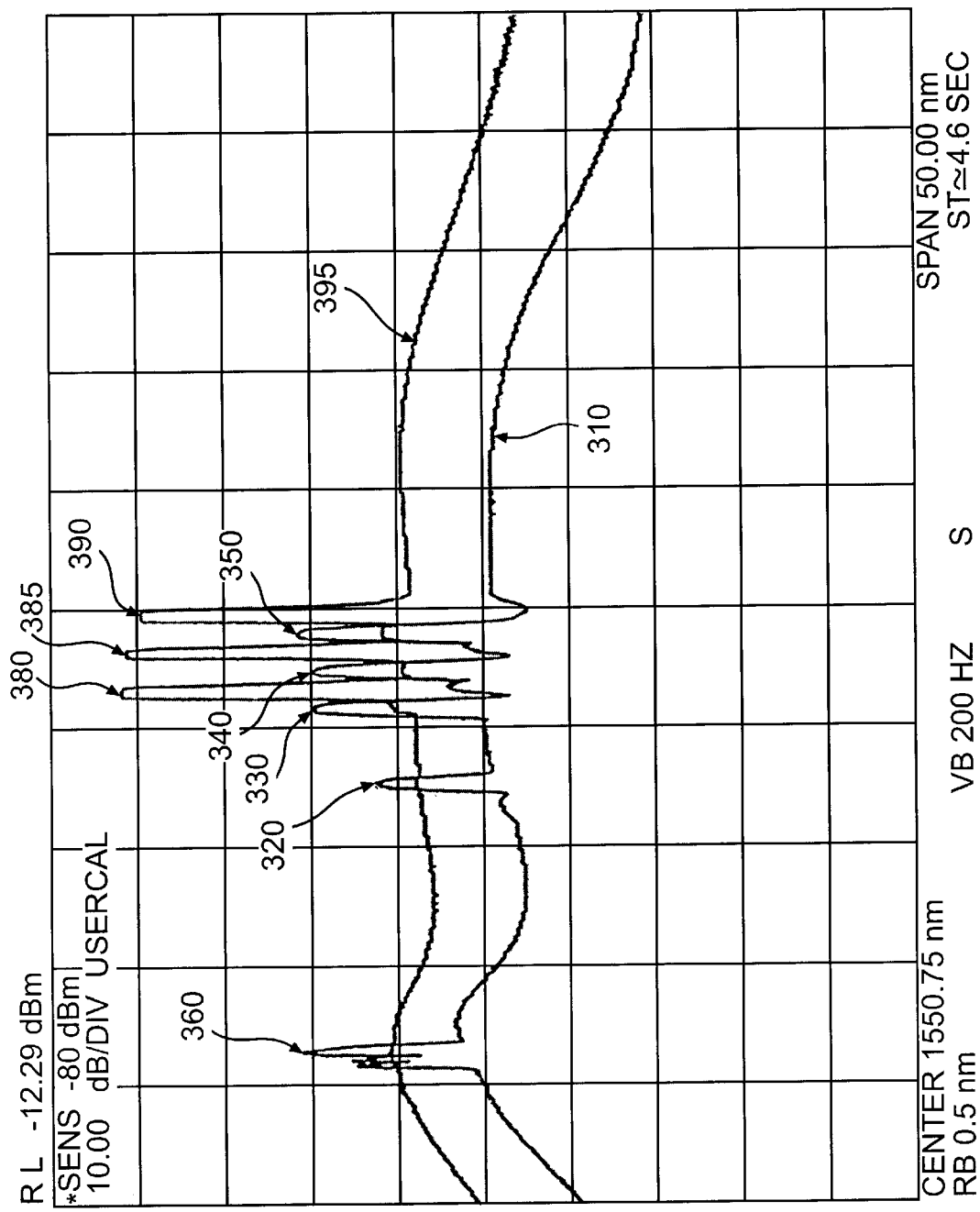
FIG. 3 is a graph of an experimental test of the amplifier module of FIG. 2.

FIG. 3 shows a graph of test results for module 200 without filter 257, which illustrates the deleterious oscillation present on the even channel line. In the graph, plot 310 corresponds to the output obtained from module 200 when operated in a WDM system operating with four even channels 320, 330, 340, and 350. As mentioned, the loop-back of noise at wavelengths beyond the channel wavelengths causes a ringing depicted by 360 in FIG. 3. In a further test ASE peak suppression filter 257 was added in module 200. Plot 395 in FIG. 3 shows the odd channels that are traveling in the opposite direction in module 200. The odd channels in the test setup for FIG. 3 had three channels designated as 380, 385, and 390 as shown on plot 395. Addition of an ASE peak suppression filter avoids the oscillation 360 and improves the output power the channels and the signal-to-noise ratio.

As mentioned above, the optical arrangement of the present invention helps to minimize interferometric noise caused by back reflections such as Rayleigh back scattering or reflections from fiber interfaces. In particular, amplified signals traveling eastbound and exiting amplifier module 200 at circulator 245 and westbound signals exiting the module at circulator 210 may lead to reflections, or echoes, at interfaces with optical fiber at ports 205 and 260, respectively. Of course, echo signals as described may also arise from Rayleigh back scattering from optical fiber lines attached to module 200. The eastbound, or odd, channels may cause echoes at the odd wavelengths that pass from port 260 into circulator 245. These odd-wavelength echoes will mix with the even channels traveling westbound in amplifier module 200. The arrangement of fiber gratings 250 will help to remove these odd-wavelength echoes in a manner described above. Similarly, fiber gratings 250 will pass even-wavelength echoes that re-enter module 200 via circulator 210, so that the even-wavelength echoes are dissipated by the isolator (not shown) coupled to the output of fiber amplifier 240.

Moreover, based on Equation (1) above, Applicants have determined that a preferred combination of components for module 200 will ensure that any echo signals have power difference of 26 dB below the corresponding channel wavelengths so that interferometric noise in module 200 is avoided. One of ordinary skill in the art will understand that a selection of appropriate devices for the amplifiers, circulators, gratings, etc. of module 200 can readily be accomplished to achieve a 26 dB difference.

Thus, each fiber grating, among other things, contributes to filtering both during reflection and during transmission, what helps to avoid interferometric noise while providing clean wavelength regions between channels for isolation so that narrower channel-to-channel spacing can be attained in a bidirectional amplification system in comparison with systems using fiber gratings only as reflection filters.

Figure 4:
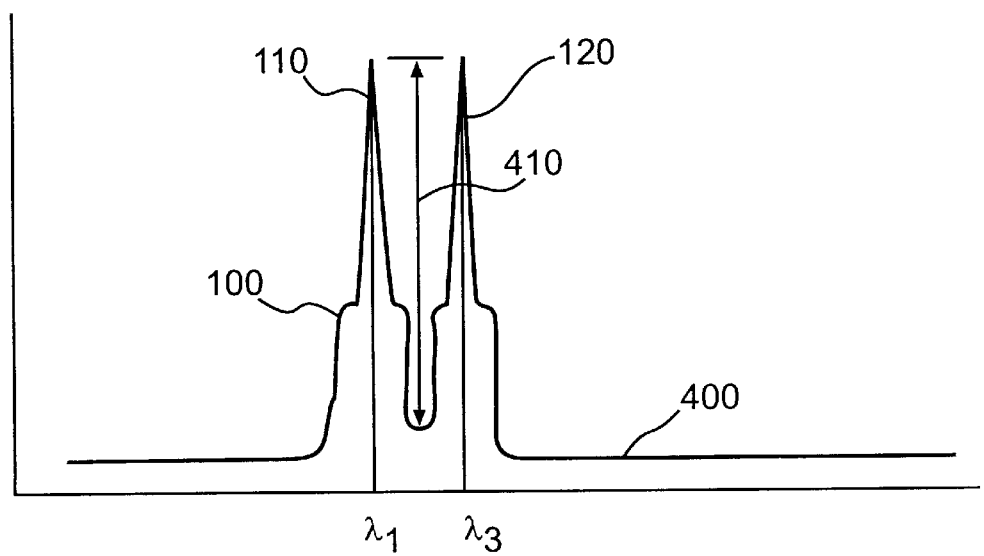
FIG. 4 is a graph of an expected performance of the first embodiment of the present invention in a WDM system with two channels.

FIG. 4 illustrates an expected performance of module 200 for two representative channels 110 and 120 of a WDM system, as measured along the fiber connecting circulators 225 and 230. As mentioned, the fiber gratings in module 200 filter out much of the ASE noise surrounding the channels. The gratings, however, have a bandwidth wider than the signal width so that the gratings do not eliminate any of the information from the channels. Curve 100 in FIG. 4 shows the remaining ASE spectrum remaining around channels 1 and 3. When compared with FIG. 1, FIG. 4 shows the elimination of unwanted ASE 100 or other noise at wavelengths between the two channels wavelengths. As mentioned, this filtering improves the isolation for the channels as compared with their echo due to back reflection at ports 260 and 205 and helps with error-free detection of the channels at a receiver downstream from module 200 in the WDM system. Furthermore, the ASE power level is reduced in comparison to conventional techniques, which leads to an increase of pumping power available to amplify the signals and to an increased gain and signal-to-noise ratio.

Figure 5:
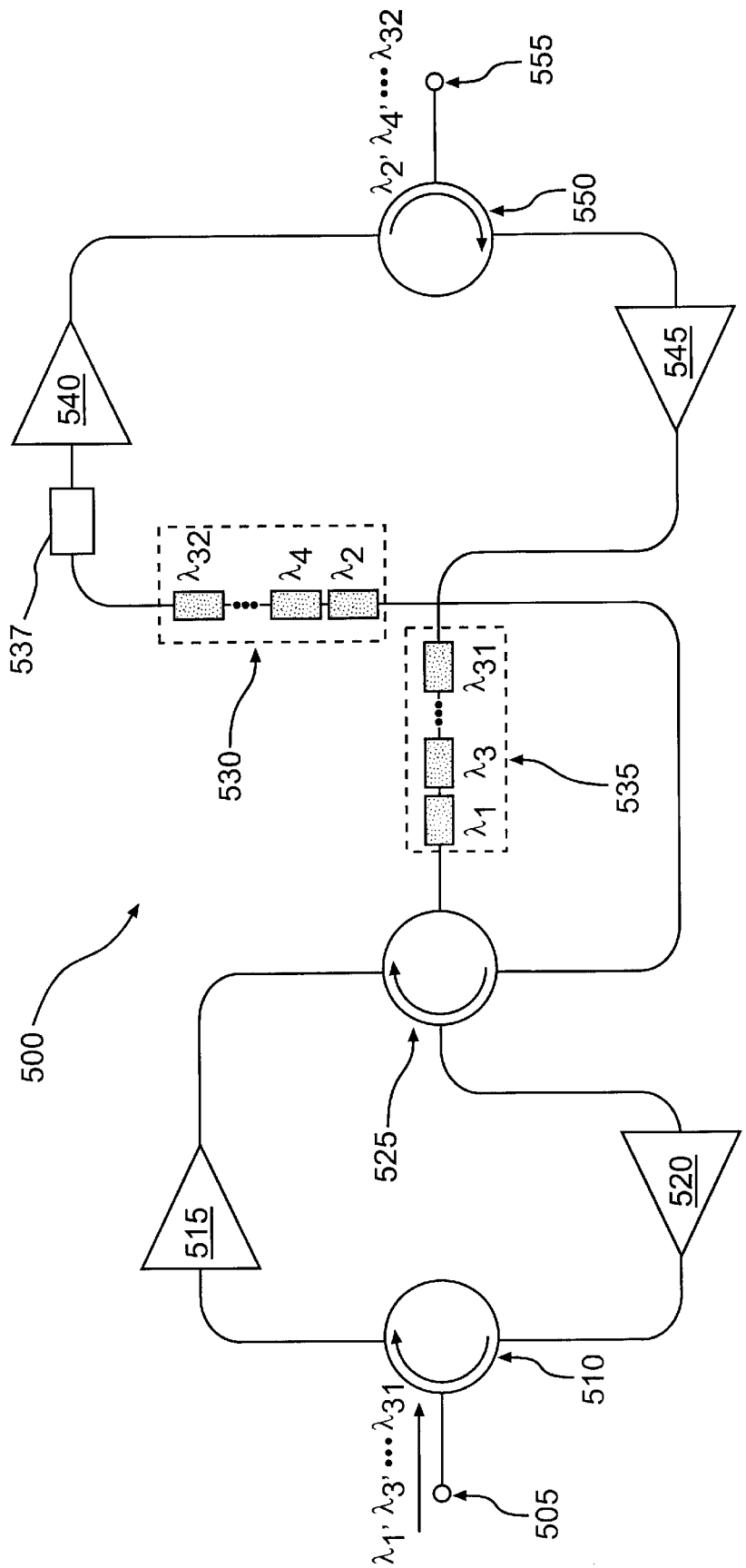
FIG. 5 is a schematic diagram of a second embodiment of the present invention for amplifying and filtering bidirectional, interleaved WDM channels.

As shown in FIG. 2, module 200 includes four optical circulators, each having three ports. However, other designs may include a different number of optical circulators having the same or different number of ports. FIG. 5 is a block diagram of another bidirectional optical amplifier module 500, consistent with the present invention, having a different number of optical circulators with a different number of ports than module 200.

In particular, module 500 includes only three optical circulators 510, 525, and 550. Also, optical circulator 525 includes four ports, whereas optical circulators 510 and 550 each include three ports. However, like module 200, module 500 includes two ports 505 and 555, four amplifiers, 515, 520, 540, and 545, and two groups of fiber gratings 530 and 535.

Module 500 operates very similarly to module 200. Like module 200, module 500 receives the odd group of channels, which travel in an easterly or inbound direction, at port 505 and the even group of channels, which travel in a westerly or outbound direction, at port 555. Ports 505 and 555 pass the odd group and even group of channels to optical circulators 510 and 550, respectively, which in turn pass the channels to amplifiers 515 and 545, respectively. The amplified odd group of channels then passes through optical circulator 525 to fiber gratings 535. The amplified even group of channels passes directly to fiber gratings 535.

Fiber gratings 535 includes gratings to reflect only signals with frequencies corresponding to the odd group of channels. Thus, fiber gratings 535 reflect the odd group of channels, but pass the even group of channels. Both groups of channels then pass through optical circulator 525 to fiber gratings 530, which include gratings to reflect only signals with frequencies corresponding to the even group of channels. Consequently, fiber gratings 530 reflect the even group of channels and pass the odd group of channels.

Subsequently, the reflected even group of channels rotates through optical circulator 525 to amplifier 520, and the odd group of channels passed by fiber gratings 530 propagates into amplifier 540 via ASE peak suppression filter 537. Amplifiers 520 and 540 amplify and pass the even group and odd group of channels through optical circulators 510 and 550 to ports 505 and 555, respectively. In the same manner as discussed above for filter 257 in module 200, filter 537 in module 500 avoids ringing or oscillation from occurring due to loop-back of ASE reflections form port 555. Consequently, the grating reflectors 535 and 530, together with ASE peak suppression filter 537 and circulator 525, serve as a filtering device between the respective two-stage amplifiers used for the odd and even groups of channels.

Thus, the present invention provides a succinct structure for amplifying and filtering bidirectional, interleaved channels in a WDM system. By filtering noise, particularly ASE, that arises between channels in an interleaved system, the bidirectional amplifier and filter of the present invention helps to improve the signal-to-noise ratio of the channels in the WDM system, which leads to improved detection of the information channels by a downstream receiver. As well, reflection noise causing oscillation between connections at the input/output ports of the amplifier module is reduced due to improved isolation. Also, isolation of channels with respect to their echo due to back reflection or back scattering is improved.

It will be apparent to those skilled in the art that various modifications and variations can be made to disclosed embodiments of the present invention without departing from the scope or spirit of the invention. For instance, other narrow band wavelength-selective reflective devices may be used instead of in-fiber Bragg gratings to separate signal wavelengths from surrounding noise. Other embodiments of the invention will be apparent to those skilled in the art from consideration of the specification and practice of the embodiments of the invention disclosed herein. The specification and examples should be considered exemplary, with the true scope and spirit of the invention being indicated by the following claims and their full range of equivalents.

What is claimed is:

1. A bidirectional optical amplifier for amplifying a first and second series of wavelengths, the second series of wavelengths being interleaved with the first series of wavelengths and traveling in an opposite direction, comprising:

a first port for receiving the first series of wavelengths;

a second port for receiving the second series of wavelengths;

a first active fiber coupled to receive and amplify the first series of wavelengths from the first port;

a second active fiber coupled to receive and amplify the second series of wavelengths from the second port;

a first set of fiber gratings having one end coupled to receive the first series of wavelengths amplified by the first active fiber and another end coupled to receive the second series of wavelengths amplified by the second active fiber, the first set having reflection wavelengths corresponding substantially to the first series of wavelengths;

a second set of fiber gratings having one end coupled to receive the first and second series of wavelengths from the one end of the first set of fiber gratings, the second set having reflection wavelengths corresponding substantially to the second series of wavelengths;

a third active fiber, coupled to receive and amplify the first series of wavelengths from another end of the second set of fiber gratings, the third active fiber being positioned to output the amplified first series of wavelengths to the second port; and a fourth active fiber, coupled to receive and amplify the second series of wavelengths reflected by the second set of fiber gratings, the fourth active fiber being positioned to output the amplified second series of wavelengths to the first port.

2. The bidirectional optical amplifier according to claim 1, further comprising:

a first optical circulator having at least three arms coupled respectively to the first port, the first active fiber, and the fourth active fiber, for passing the first series of wavelengths received at the first port to the first active fiber and for passing the amplified second series of wavelengths from the fourth active fiber to the first port; and a second optical circulator having at least three arms coupled respectively to the second port, the second active fiber, and the third active fiber, for passing the second series of wavelengths received by the second port to the second active fiber and for passing the amplified first series of wavelengths from the third active fiber to the second port.

3. The bidirectional optical amplifier according to claim 2, further comprising:

a third optical circulator having at least four arms coupled respectively to the first amplifier, the first set of fiber gratings, the second set of fiber gratings, and the fourth active fiber, for passing the first series of wavelengths amplified by the first active fiber to the first group of fiber gratings, for passing the first and second series of wavelengths from the first set of fiber gratings to the second set of fiber gratings, and for passing the second series of wavelengths reflected by the second set of fiber gratings to the fourth active fiber.

4. The bidirectional optical amplifier according to claim 2, further comprising:

a third optical circulator having two adjacent arms coupled respectively to the first active fiber and to the one end of the first set of fiber gratings; and a fourth optical circulator having two adjacent arms coupled respectively to the one end of the second set of fiber gratings and to the fourth active fiber, and a third arm connected to a third arm of the third optical circulator.

5. The bidirectional optical amplifier according to claims 1 or 2, further comprising an ASE peak suppression filter positioned in an optical path between the second and third active fibers.

6. The bidirectional optical amplifier according to claim 5, wherein the ASE peak suppression filter is optically positioned between the second set of fiber gratings and the third active fiber.

7. The bidirectional optical amplifier according to claim 1, wherein the first and second active fibers operate in a linear mode and the third and fourth active fibers operate in a saturated mode.

8. The bidirectional optical amplifier according to claim 1, wherein consecutive ones of the first series of wavelengths are separated by about 200 GHz.

9. The bidirectional optical amplifier according to claim 1, wherein consecutive ones of the second series of wavelengths are separated by about 200 GHz.

10. An apparatus for amplifying bidirectional, interleaved wavelength-division-multiplexed (WDM) signals, comprising:

a first bidirectional transfer device positioned to receive eastbound WDM signals;

a second bidirectional transfer device positioned to receive westbound WDM signals;

an eastbound fiber amplifier positioned between the first and second bidirectional transfer devices for amplifying the eastbound WDM signals;

a westbound fiber amplifier positioned between the second and first bidirectional transfer devices for amplifying the westbound WDM signals; and a filtering module positioned between the eastbound and westbound fiber amplifiers, the filtering module including a first filter for reflecting toward a second filter the eastbound WDM signals entering an end of the first filter from the eastbound fiber amplifier and for passing toward the second filter the westbound WDM signals entering an opposite end of the first filter from the westbound fiber amplifier; and the second filter for reflecting toward the first bidirectional transfer device the westbound WDM signals entering an end of the second filter from the first filter and for passing toward the second bidirectional transfer device the eastbound WDM signals.

11. The apparatus according to claim 10, wherein the first bidirectional transfer device is an optical circulator with a first port optically coupled to the eastbound fiber amplifier, a second port optically coupled to the second filter, and a third port for inputting the eastbound WDM signals and outputting the westbound WDM signals.

12. The apparatus according to claim 10, wherein the second bidirectional transfer device is an optical circulator with a first port optically coupled to the westbound fiber amplifier, a second port optically coupled to the second filter, and a third port for inputting the westbound WDM signals and outputting the eastbound WDM signals.

13. The apparatus according to claim 12, wherein the eastbound and westbound fiber amplifiers comprise first and second stages respectively.

14. The apparatus according to claim 13, wherein the filtering module further comprises an optical circulator having at least four arms coupled respectively to the first stage of the eastbound fiber amplifier, the end of the first filter, the end of the second filter, and the second stage of the westbound fiber amplifier.

15. The apparatus according to claim 13, wherein the filtering module further comprises
- a first optical circulator having two adjacent arms coupled respectively to the first stage of the eastbound fiber amplifier and to the end of the first filter, and
- a second optical circulator having two adjacent arms coupled respectively to the end of the second filter and to the second stage of the westbound fiber amplifier, and a third arm connected to a third arm of the first optical circulator.

16. The apparatus according to claim 13, wherein the filtering device further comprises an ASE peak suppression filter positioned in an optical path between the first stage of the westbound fiber amplifier and the second stage of the eastbound fiber amplifier.

17. The apparatus according to claim 16, wherein the ASE peak suppression filter is optically positioned between the second filter and the second stage of the eastbound fiber amplifier.

18. A bidirectional optical transmission system for transmitting bidirectional, interleaved wavelength-division-multiplexed (WDM) signals, comprising a first transmitting/receiving station, for transmitting eastbound WDM signals and receiving westbound WDM signals;
- a second transmitting/receiving station, for transmitting westbound WDM signals and receiving eastbound WDM signals;
- an optical fiber transmission line between the first and second transmitting/receiving station, and
- an apparatus for amplifying bidirectional, interleaved WDM signals according to one of claims 10–17, arranged along said optical fiber transmission line.

19. A method for bidirectional transmission of optical signals, comprising the steps of:
- amplifying a first plurality of signals having different wavelengths;
- reflecting each of the amplified plurality of signals with a first plurality of Bragg gratings;
- filtering each of the reflected first plurality of signals with a second plurality of Bragg gratings;
- amplifying the filtered first plurality of signals;
- amplifying a second plurality of signals having wavelengths different from the first plurality of signals;
- filtering each of the amplified second plurality of signals with the first plurality of Bragg gratings;
- reflecting each of the filtered second plurality of signals with the second plurality of Bragg gratings; and
- amplifying the reflected second plurality of signals.

20. A method for bidirectional transmission of optical signals according to claim 19, wherein the wavelengths of the first plurality of signals are interleaved with the wavelengths of the second plurality of signals.

21. A method for bidirectional transmission of optical signals according to claim 19, wherein the wavelengths of the first plurality of signals form first packets of adjacent wavelengths, the wavelengths of the second plurality of signals form second packets of adjacent wavelengths and the first and second packets of wavelengths are interleaved.

* * * * *